(12) United States Patent
Katayama

(10) Patent No.: US 7,055,473 B2
(45) Date of Patent: Jun. 6, 2006

(54) CONTROL SYSTEM FOR OUTBOARD MOTOR

(75) Inventor: Goichi Katayama, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 86 days.

(21) Appl. No.: 10/716,910

(22) Filed: Nov. 19, 2003

(65) Prior Publication Data

US 2004/0107925 A1   Jun. 10, 2004

(30) Foreign Application Priority Data

Nov. 21, 2002  (JP) .............................. 2002-337999

(51) Int. Cl.
*F01L 1/34* (2006.01)
(52) U.S. Cl. .............................. 123/90.15; 123/90.16; 123/90.31; 123/90.17; 440/1; 440/2; 440/87; 440/900; 477/107; 477/108; 477/109
(58) Field of Classification Search ............. 123/90.15, 123/90.16; 440/1, 2, 900; 477/108
See application file for complete search history.

(56) References Cited

U.S. PATENT DOCUMENTS

| 4,428,734 | A | * | 1/1984 | Ludlow ........................ 440/75 |
| 5,937,825 | A | | 8/1999 | Motose |
| 6,336,432 | B1 | * | 1/2002 | Tachibana et al. ........ 123/90.15 |
| 6,349,700 | B1 | * | 2/2002 | Buckland et al. ............ 123/352 |
| 6,549,830 | B1 | | 4/2003 | Harada et al. |
| 6,554,091 | B1 | * | 4/2003 | Mianzo et al. ............... 180/197 |
| 6,558,214 | B1 | * | 5/2003 | Nanami ........................ 440/87 |
| 6,637,396 | B1 | | 10/2003 | Katayama |
| 6,640,790 | B1 | | 11/2003 | Katayama et al. |
| 2002/0014214 | A1 | | 2/2002 | Katayama |
| 2002/0043232 | A1 | | 4/2002 | Katayama |
| 2003/0003824 | A1 | | 1/2003 | Katayama et al. |
| 2003/0005900 | A1 | | 1/2003 | Katayama et al. |
| 2003/0005901 | A1 | | 1/2003 | Katayama |
| 2003/0008573 | A1 | | 1/2003 | Katayama |
| 2003/0019450 | A1 | | 1/2003 | Katayama |
| 2003/0054704 | A1 | | 3/2003 | Kanno |

OTHER PUBLICATIONS

Co-Pending U.S. Appl. No. 10/189,591, filed: Jul. 3, 2002. Title: Valve timing control for marine engine. Inventor: Goichi Katayama.
Co-Pending U.S. Appl. No. 10/205,049, filed: Jul. 25, 2002. Title: Four cycle engine for marine drive. Inventor: Goichi Katayama.

* cited by examiner

*Primary Examiner*—Thomas Denion
*Assistant Examiner*—Kyle M. Riddle
(74) *Attorney, Agent, or Firm*—Knobbe, Martens, Olson & Bear, LLP

(57) ABSTRACT

An internal combustion engine comprising an engine body. A combustion chamber is formed in the engine body and has at least one valve seat. A valve is configured to move between an open position and a closed position of the valve seat. A valve actuator is configured to actuate the valve. A variable valve timing mechanism is configured to change an actuating timing of the valve actuator at which the valve actuator actuates the valve. At least one sensor configured to sense and operational condition of the engine. A control device is configured to determine if the engine is operating in a cruising mode. The control device is also configured to reduce engine speed fluctuations during the cruising mode by adjusting the actuating timing of the valve actuator.

16 Claims, 9 Drawing Sheets

CONTROL SYSTEM FOR OUTBOARD MOTOR

PRIORITY INFORMATION

This application is based on and claims priority to Japanese Patent Application No. 2002-337999, filed Nov. 21, 2002, the entire contents of which is hereby expressly incorporated by reference.

BACKGROUND OF THE INVENTION

1. Field of the Inventions

The present embodiments generally relate to a control system, and more particularly, to a control system for an outboard motor.

2. Description of the Related Art

Marine drives such as outboard motors, include a marine propulsion device powered by an engine. The propulsion device typically is a propeller and is submerged when an associated watercraft rests on a body of water. The outboard motor can employ either a two-cycle engine or a four-cycle engine. Recently, however, many outboard motors have been offered with four-cycle engines because they provide better emissions control.

In certain conditions, the operator of the outboard motor desires to operate the motor in a cruising mode. In such a mode of operation, the operator generally tries to keep the engine speed constant to maintain a desired boat speed for a prolonged period of time. This may be accomplished by manually manipulating a throttle lever. However, during cruising, the outboard motor may experience significant load fluctuations. Such fluctuations may be caused by weather conditions (e.g., changing wind direction, wind volume, wave height and wave direction). These load fluctuations can be greater than the load fluctuations encountered by land vehicles during cruising operations. Another cause of load fluctuations in outboard motors is wave riding. During wave riding, the engine speed drops as the watercraft rides onto a wave and then increases as the watercraft rides over the wave.

To compensate for these load fluctuations, an operator might manipulate the throttle lever in an attempt to compensate for the load fluctuations described above. In general, it can be quite troublesome and tiresome for the operator to continuously manipulate the throttle lever in this manner.

SUMMARY OF THE INVENTION

An aspect of at least one of the inventions disclosed herein includes the realization that a variable valve timing system can be used to enhance a riding experience during cruising. For example, as noted above, when cruising in a watercraft, certain conditions, including weather and waves, can cause load, engine speed, and thus, watercraft speed fluctuations. Thus, a system for adjusting the power output of the engine can be used to smooth such fluctuations. In at least one of the embodiments disclosed herein, a variable valve timing system is used to adjust a power output of an engine so as to compensate for load fluctuations. As such, an operator of such a watercraft, or other vehicle, can enjoy a more comfortable ride with less manual throttle lever manipulation.

In accordance with at least one of the embodiments disclosed herein, an internal combustion engine comprises an engine body, a movable member movable relative to the engine body, the engine body and the movable member together defining a combustion chamber. The engine body also defines intake and exhaust ports communicating with the combustion chamber. An air induction system communicates with the combustion chamber through the intake port. An exhaust system communicates with the combustion chamber through the exhaust port. An intake valve is configured to move between an open position and a closed position of the intake port. An exhaust valve is configured to move between an open position and a closed position of the exhaust port. A valve actuator is configured to actuate either the intake valve or the exhaust valve. A change mechanism configured to change an actuating timing of the valve actuator at which the valve actuator actuates the intake valve or the exhaust valve. A control device is configured to control the change mechanism and at least a first sensor configured to sense an operational condition of the engine and to send a first signal to the control device. The control device is also configured to determine if the engine is in a cruising mode based, at least in part, on the first signal and to control the change mechanism to advance or retard the timing of the valve actuator to reduce engine speed fluctuations when the engine is in a cruising mode.

In accordance with at least one of the embodiments disclosed herein, a method is provided for controlling an internal combustion engine which includes intake and exhaust valves, a valve actuator configured to actuate the intake and exhaust valves, and a change mechanism configured to change an actuating timing of the valve actuator at which the valve actuator actuates at least one of the intake valve and the exhaust valve. The method comprises sensing an operational condition of the engine, determining whether the engine is operating in a cruising state, determining an engine speed of the engine, determining if the engine speed is fluctuating beyond a predetermined value, and adjusting the actuating timing of the valve actuator to reduce the engine speed fluctuations.

In accordance with at least one of the embodiments disclosed herein, an internal combustion engine comprises an engine body, a combustion chamber having at least one valve seat, a valve configured to move between an open position and a closed position of the valve seat, and a valve actuator configured to actuate the valve. A variable valve timing mechanism is configured to change an actuating timing of the valve actuator at which the valve actuator actuates the valve. The engine also includes means for reducing fluctuations in a speed of the engine while the engine is in a cruising mode by adjusting the actuating timing of the valve actuator.

BRIEF DESCRIPTION OF THE DRAWINGS

These and other features, aspects and advantages of the present invention are described below with refejence to the drawings of several preferred embodiments, which are intended to illustrate and not to limit the invention. The drawings comprise ten figures.

DETAILED DESCRIPTION OF THE PREFERRED EMBODIMENTS

Figure 1:
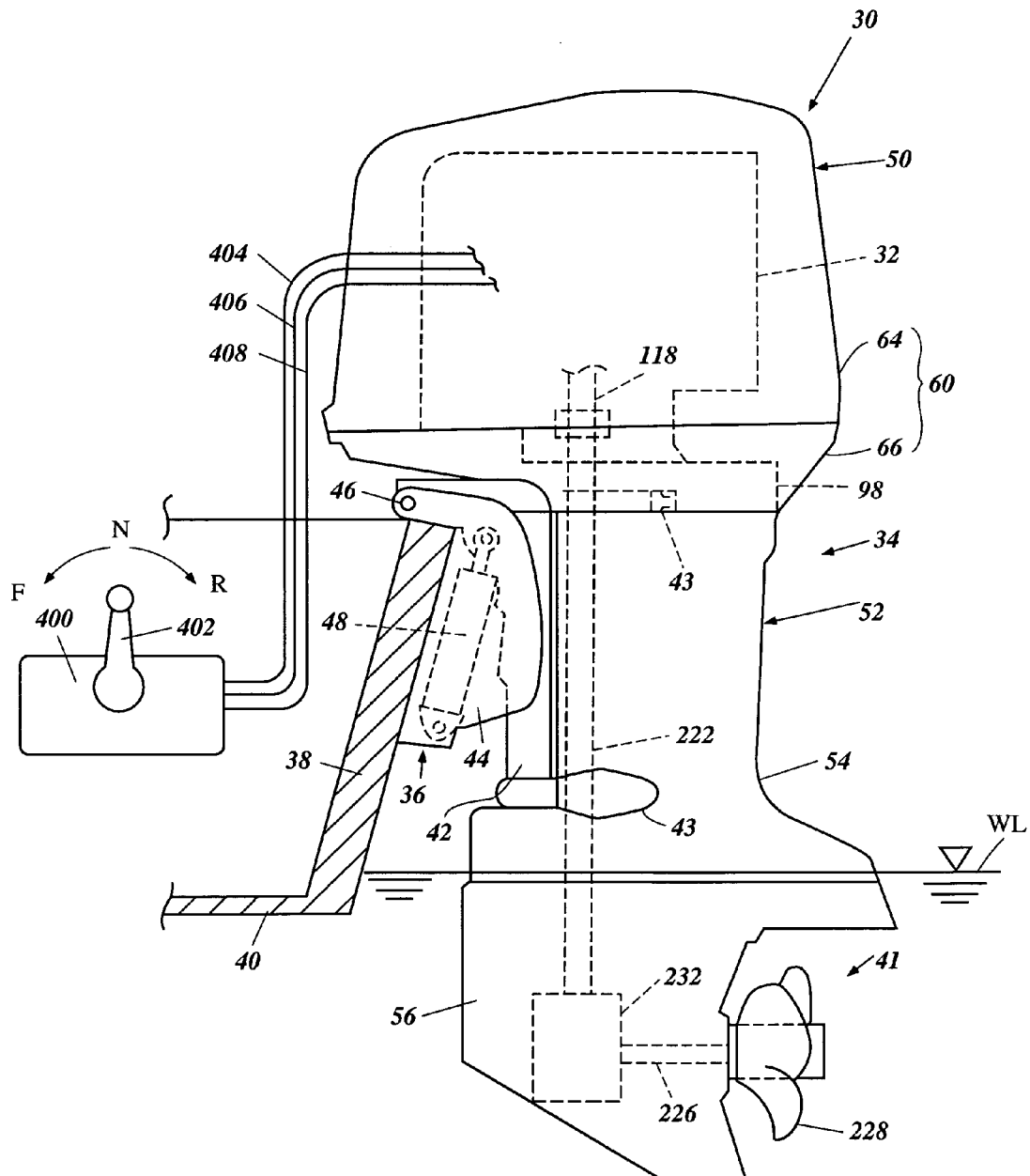
FIG. 1 is a side elevational view of an outboard motor configured in accordance with a preferred embodiment of the present invention. An engine and drive train are illustrated in phantom.

With initial reference to FIG. 1, an overall construction of an outboard motor 30 that employs an internal combustion engine 32 configured in accordance with certain features, aspects and advantages of at least one of the embodiments is described below. The engine 32 has particular utility in the context of a marine drive, such as the outboard motor, and thus is described in the context of an outboard motor. The engine 32, however, can be used with other types of marine drives (i.e., inboard motors, inboard/outboard motors, jet drives, etc.) as well as certain land vehicles. In any of these applications, the engine 32 can be oriented vertically or horizontally. Furthermore, the engine 32 can be used as a stationary engine for some applications as is apparent to those of ordinary skill in the art in light of the description herein.

The outboard motor 30 comprises a drive unit 34, a bracket assembly 36, and a marine propulsion device 41. The bracket assembly 36 supports the drive unit 34 on a transom 38 of an associated watercraft 40 and places the marine propulsion device 41 in a submerged position when the watercraft 40 rests on a surface of a body of water WL. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies 43. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or toward the side where the bracket assembly 36 is located, and the terms "rear," "reverse," "backwardly" and "rearwardly" mean at or toward the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52. The housing unit 52 includes a driveshaft housing 54 and a lower unit 56. The power head 50 is disposed atop the drive unit 34 and includes the internal combustion engine 32 and a protective cowling assembly 60.

Figure 2:
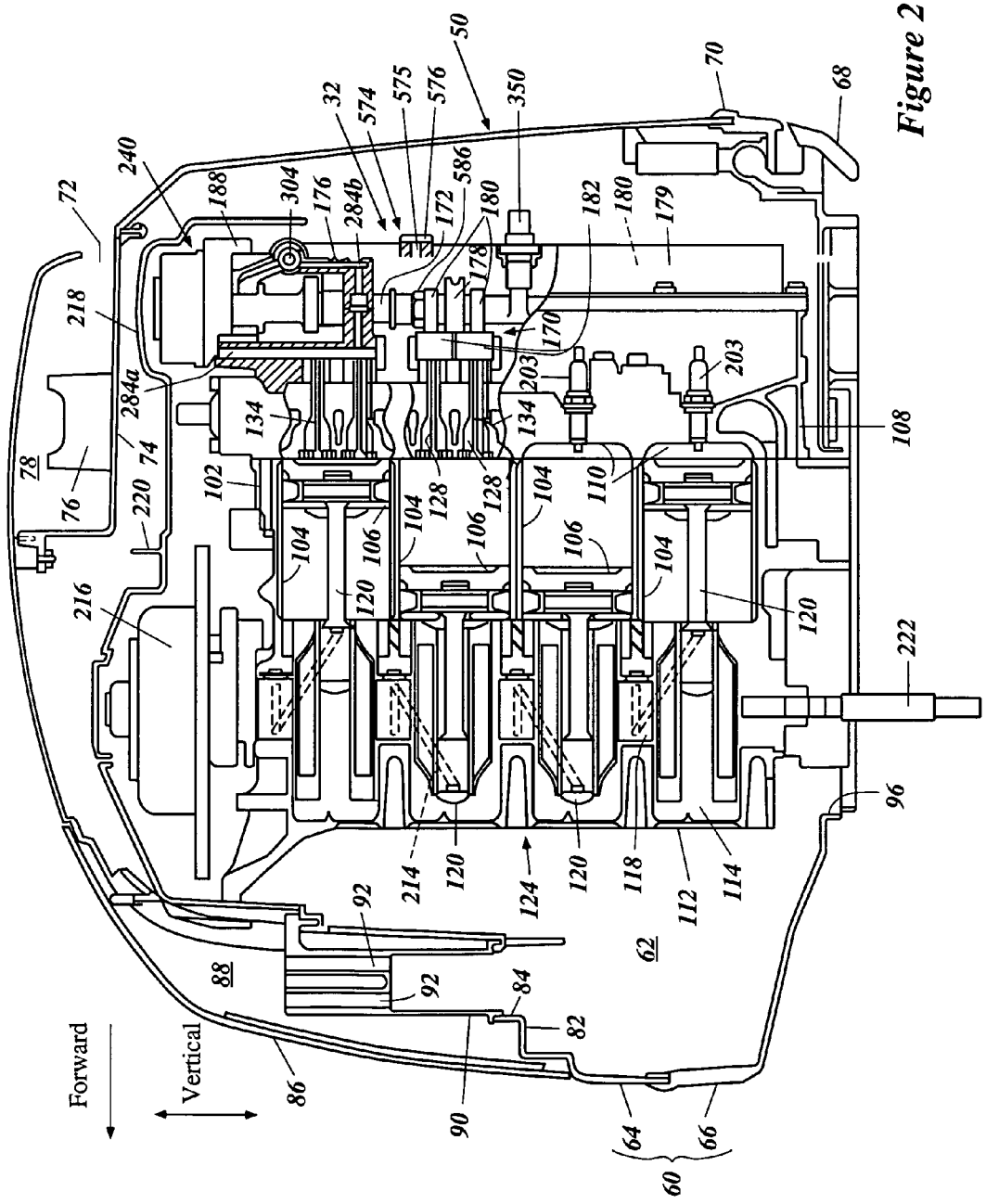
FIG. 2 is an enlarged partial sectional and port side elevational view of a power head of the outboard motor. A camshaft drive mechanism is omitted in this figure except for portion for driving an intake camshaft.

With reference to FIG. 2, preferably the protective cowling 60 is made of plastic and defines a generally closed cavity 62 in which the engine 32 is disposed. That is, the cowling assembly 60 surrounds the engine 32. The protective cowling assembly 60 preferably comprises a top cowling member 64 and a bottom cowling member 66. The top cowling member 64 preferably is detachably affixed to the bottom cowling member 66 by a coupling mechanism 68. When the top cowling member 64 is detached, a user, operator, mechanic or repairperson can access the engine 32 for maintenance or for other purposes.

The top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. The rear air duct 76 preferably is disposed to the starboard side of a central portion of the rear intake member 74.

With continued reference to FIG. 2, the top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 (FIG. 2) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

Figure 3:
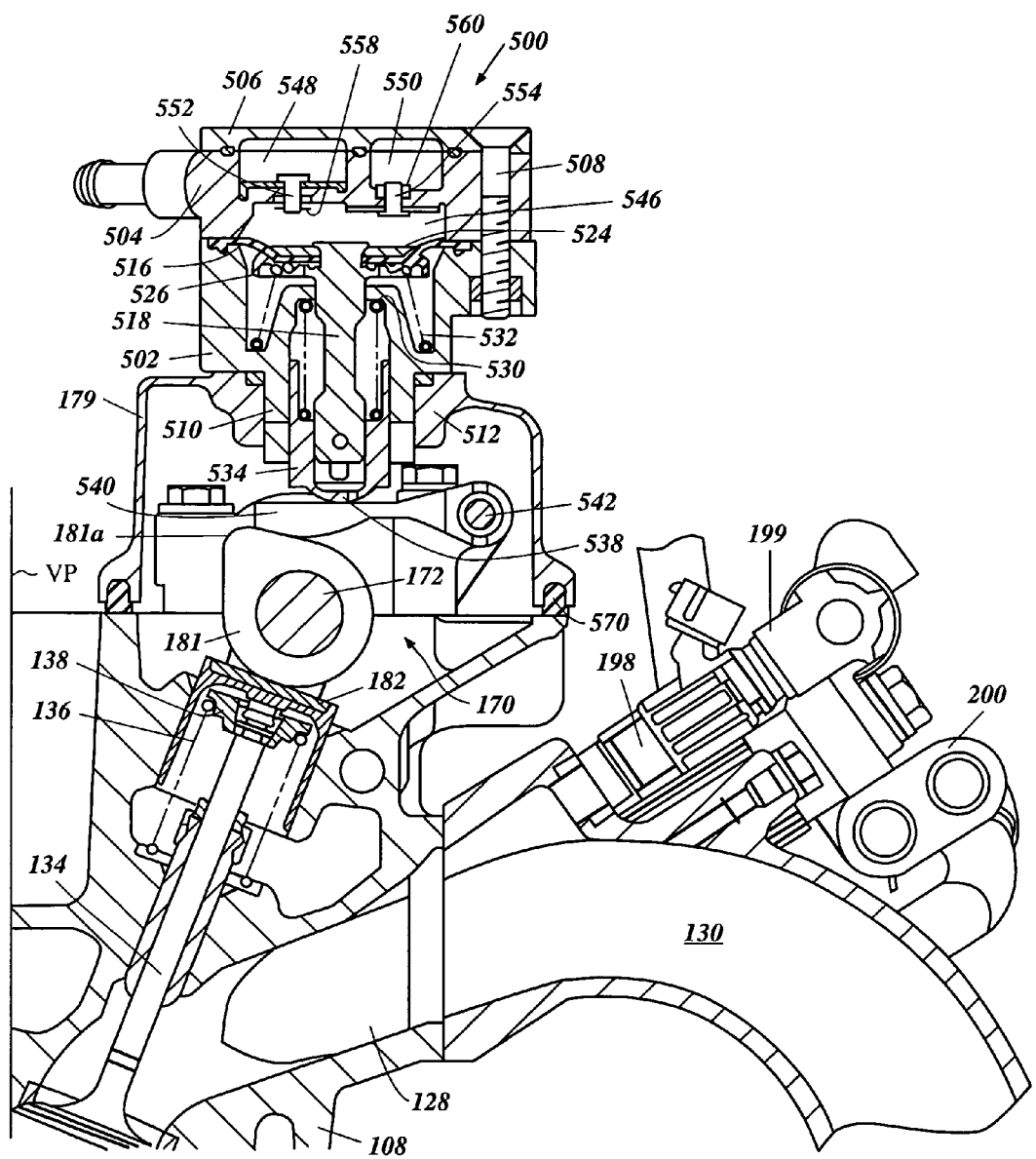
FIG. 3 is an enlarged, partial sectional and top plan view of the engine illustrating part of an intake system, part of a fuel injection system and a fuel pump assembly of the fuel injection system.

With reference FIGS. 2 and 3, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line WL when the associated watercraft 40 is substantially stationary with respect to the water line WL and when the drive unit 34 is not tilted and is placed in the position shown in FIG. 1. The term "vertically" in turn means that portions, members or components extend generally normal to those that extend horizontally.

This type of engine, however, merely exemplifies one type of engine on which various aspects and features of the present invention can be suitably used. Engines having other numbers of cylinders and having other cylinder arrangements (V, W, opposing, etc.) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore 104.

A moveable member, such as a reciprocating piston 106, moves relative to the cylinder block 102 in a suitable manner. One piston 106 reciprocates within each cylinder bore 104.

A cylinder head member 108 is affixed to one end of the cylinder block 102 to close one end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). A center vertical plane VP (not shown) of the outboard motor 30 extends generally vertically and fore to aft through the cylinder block 102, the cylinder head member 108, and the crankcase member 112. The vertical plane VP preferably includes a longitudinal axis of the crankshaft 118. Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the forward-most position of the engine 32, with the cylinder block 102 and the cylinder head member 108 being disposed rearward from the crankcase member 112. Generally, the cylinder block 102 (or individual cylinder bodies), the cylinder head member 108, and the crankcase member 112 together define an engine body 124. Preferably, at least these major engine portions 102, 108, 112 are made of an aluminum alloy. The aluminum alloy advantageously increases strength over cast iron while decreasing the weight of the engine body 124.

The engine 32 also comprises an air induction system or device, which is shown partially in FIG. 2. The air induction system draws air from within the cavity 62 to the combustion chambers 110. The air induction system 126 preferably comprises eight intake ports 128 (see also FIG. 3), four intake passages 130 (FIG. 3) and a single plenum chamber (not illustrated). In the illustrated arrangement, two intake ports 128 are allotted to each combustion chamber 110 and the two intake ports 128 communicate with a single intake passage 130.

The intake ports 128 are defined in the cylinder head member 108. Intake valves 134 are slidably disposed at the intake ports 128 within the cylinder head member 108 to move between an open position and a closed position. As such, the valves 134 act to open and close the ports 128 to control the flow of air into the combustion chamber 110.

With reference to FIG. 3, biasing members, such as springs 136, are used to bias the intake valves 134 toward the respective closed positions by acting against a mounting boss formed on the illustrated cylinder head member 108 and a corresponding retainer 138 that is affixed to each of the valves 134. When each intake valve 134 is in the open position, the intake passage 130 that is associated with the intake port 128 communicates with the associated combustion chamber 110.

Each intake passage 130 preferably is defined by an intake manifold (not shown), a throttle body (not shown) and an intake runner (not shown). The intake manifold and the throttle body preferably are made of aluminum alloy. The intake runner preferably is made of plastic. A portion of the intake runner preferably extends forwardly alongside of and to the front of the crankcase member 112. In one embodiment, the respective portions of the intake runners, together with a plenum chamber member, define the plenum chamber Preferably, the plenum chamber member is also made of plastic.

The plenum chamber preferably comprises an air inlet (not shown). The air in the cavity 62 is drawn into the plenum chamber through the air inlet. The air is then passed through intake passages 130, the throttle body and the intake manifold. Preferably, the plenum chamber is configured to attenuate noise generated by the flow of air into the respective combustion chambers 110, and thus act as an "intake silencer."

The throttle body preferably includes a butterfly type throttle valve journaled for pivotal movement about an axis defined by a generally vertically extending valve shaft. Each valve shaft can be coupled with the other valve shafts to allow simultaneous movement. The valve shaft is operable by the operator through an appropriate conventional throttle valve linkage and a throttle lever connected to the end of the linkage. The throttle valves are movable between an open position and a closed position to meter or regulate an amount of air flowing through the respective air intake passages 130. Normally, the greater the opening degree, the higher the rate of airflow and the higher the power output of the engine.

In order to bring the engine 32 to idle speed and to maintain this speed, the throttle valves generally are substantially closed. Preferably, the valves are not fully closed in the idle position so as to produce a more stable idle speed and to prevent sticking of the throttle valves in the closed position. As used through the description, the term "idle speed" generally means a low engine speed that achieved when the throttle valves are closed but also includes a state such that the valves are slightly more open to allow a relatively small amount of air to flow through the intake passages 130.

Further details and illustrations regarding the exemplary embodiment of the air induction system see U.S. patent application Ser. No. 10/205,049, filed Jul. 25, 2002 and entitled "FOUR CYCLE ENGINE FOR MARINE DRIVE", which is hereby incorporated by reference in its entirety herein.

The air induction system preferably includes an auxiliary air device (AAD) (not shown) that bypasses the throttle valves and extends from the plenum chamber to the respective intake passages 130 downstream of the throttle valves. Auxiliary air, primarily idle air, can be delivered to the combustion chambers 110 through the AAD when the throttle valves are placed in a substantially closed or closed position.

The AAD preferably comprises an auxiliary air passage, an auxiliary valve and an auxiliary valve actuator. The auxiliary air passage is branched off to the respective intake passages 130. The auxiliary valve controls flow through the auxiliary air passage such that the amount of air flow can be more precisely controlled. Preferably, the auxiliary valve is a needle valve that can move between an open position and a closed position, which closes the auxiliary air passage. The auxiliary valve actuator actuates the auxiliary valve to meter or adjust an amount of the auxiliary air.

Figure 5:
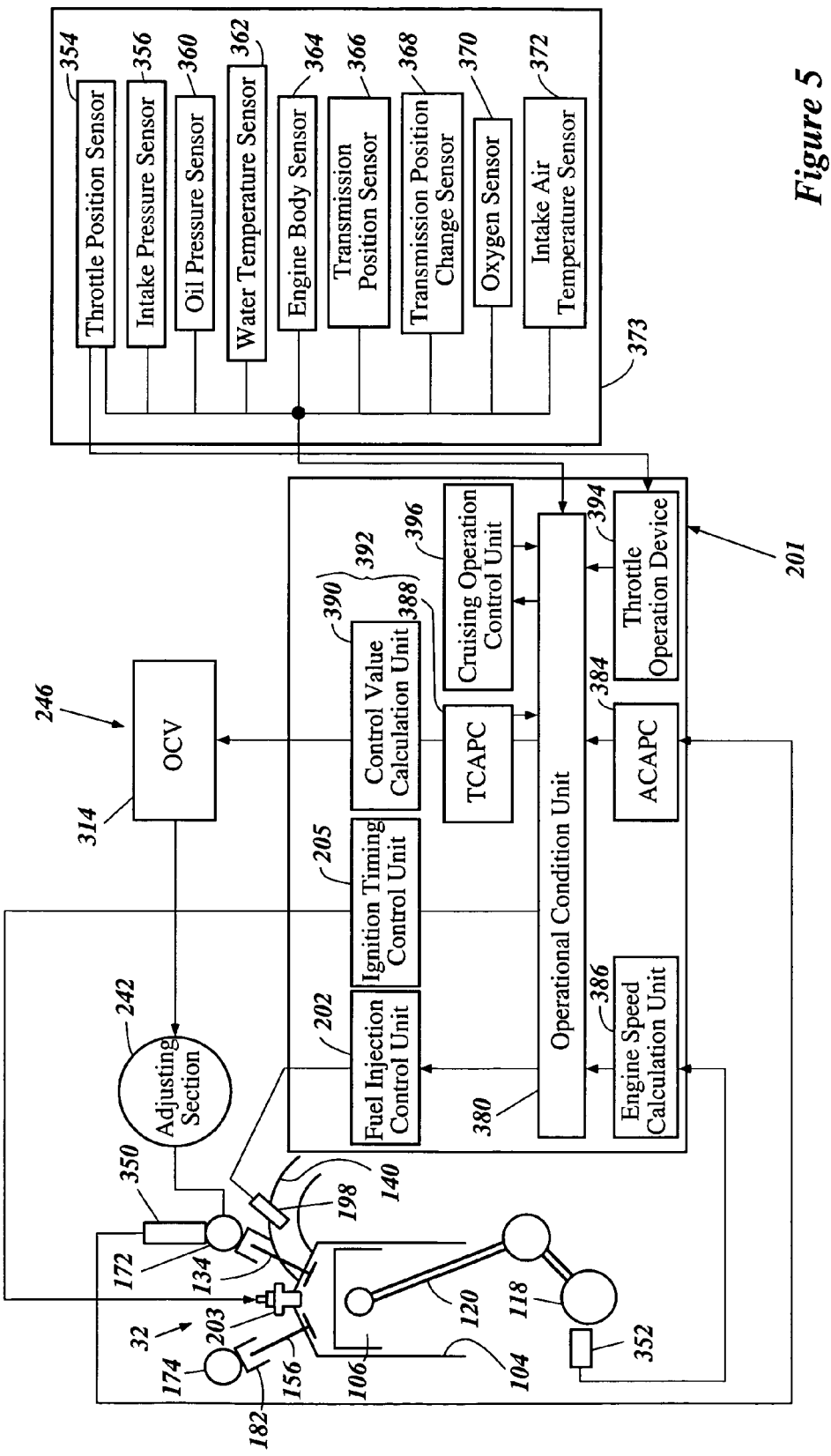
FIG. 5 is a block diagram of an engine operating system and various engine components.

The engine 32 also comprises an exhaust system that guides burnt charges, i.e., exhaust gases, to a location outside of the outboard motor 30. Each cylinder bore 104 preferably has two exhaust ports (not shown) defined in the cylinder head member 108. The exhaust ports can be selectively opened and closed by exhaust valves. The exhaust valves are schematically illustrated in FIG. 5, described below, and are identified by reference numeral 156. The construction of each exhaust valve and the arrangement of the exhaust valves are substantially the same as the intake valves 134 and the arrangement thereof, respectively.

An exhaust manifold (not shown) preferably is disposed next to the exhaust ports (not shown) and extends generally vertically. The exhaust manifold communicates with the combustion chambers 110 through the exhaust ports to collect exhaust gases therefrom. The exhaust manifold is coupled with the exhaust passage of the exhaust guide member 98. When the exhaust ports are opened, the combustion chambers 110 communicate with the exhaust passage through the exhaust manifold.

Figure 4:
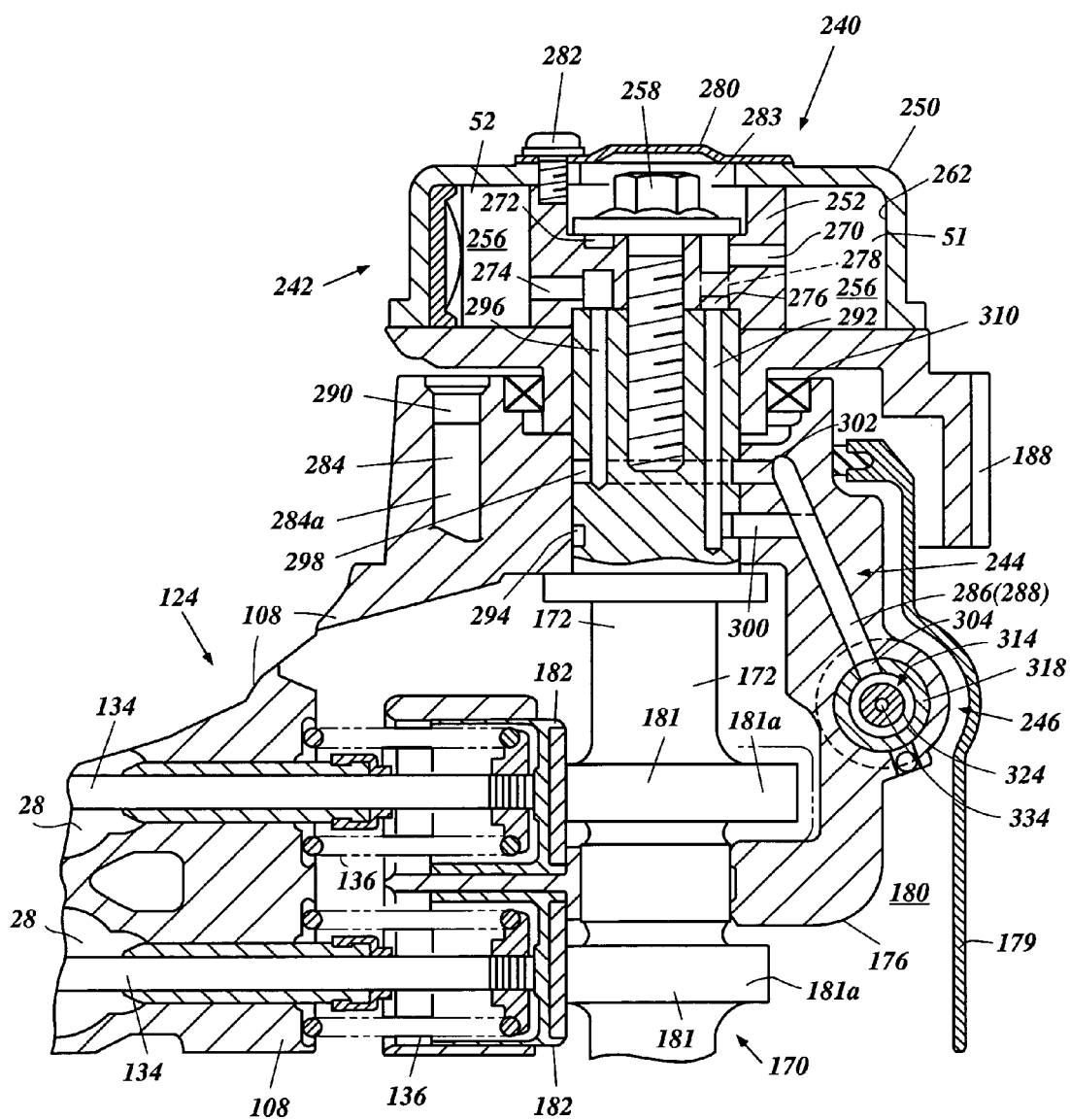
FIG. 4 is an enlarged, partial sectional and side elevational view of the engine illustrating a VVT mechanism thereof.

With particular reference to FIGS. 2, 3 and 4, a valve cam mechanism or valve actuator 170 preferably is provided for actuating the intake valves 134 and the exhaust valves 156 (FIG. 5). In the illustrated arrangement, the valve cam mechanism 170 includes an intake camshaft 172 and an exhaust camshaft 174 (FIG. 5) both extending generally vertically and journaled for rotation relative to the cylinder head member 108. In the illustrated arrangement, bearing caps 176, 178 (FIG. 2) journal the camshafts 172, 174 with the cylinder head member 108.

A camshaft cover member 179 is preferably affixed to the cylinder head member 108 by bolts (not shown) via a seal member 570 made of, for example, rubber to define a pair of camshaft chambers 180 together with the cylinder head member 108. In one embodiment, the seal member not only seals but also prevents the camshaft cover member 179 from vibrating. As shown in FIG. 2, the camshaft cover member 179 abuts the cylinder head member 108. Each camshaft 172, 174 is enclosed within each camshaft chamber 180. Alternatively, separate camshaft cover members can replace the single cover member 180 to separately enclose the camshafts 172, 174.

Each camshaft 172, 174, as shown in FIG. 4, has a plurality of cams 181 associated with the intake or exhaust valves 134, 156. Each cam 181 defines a cam lobe 181a to push valve lifters 182 that are affixed to the respective ends of the intake valves 134 and exhaust valves 156 (FIG. 5) as in any suitable manner. The cam lobes 181a repeatedly push the valve lifters 182 in a timed manner, which is in proportion to the engine speed. The movement of the lifters 182 generally is timed by the rotation of the camshafts 172, 174 to actuate the intake valves 134 and the exhaust valves.

As shown in FIG. 4, in the illustrated arrangement, a top end of the camshaft cover member 179 is nested between an inner surface of a sprocket 188 (described below) and an outer surface of a top end of the cylinder block 108. Thus, the camshaft cover member 179 is attached to or detached from the intake camshaft 172 with the sprocket 188 removed. This arrangement allows the total height of the engine 32 to be shorter.

With reference to FIG. 3, a camshaft drive mechanism (not shown) drives the valve cam mechanism 170. The intake camshaft 172 and the exhaust camshaft 174 include the intake driven sprocket 188 positioned atop the intake camshaft 172 and an exhaust driven sprocket (not shown) positioned atop the exhaust camshaft 174. The crankshaft 118 has a drive sprocket (not shown) positioned at an upper portion thereof. Of course, other locations of the sprockets also can be used. The illustrated arrangement, however, advantageously results in a compactly arranged engine. Further details and illustrations regarding the exemplary embodiment of the camshaft drive mechanism and the valve actuator 170 can be found in U.S. patent application Ser. No. 10/205,049, filed Jul. 25, 2002 and entitled "FOUR CYCLE ENGINE FOR MARINE DRIVE", which is incorporated by reference above.

A timing chain or belt (not shown) is wound around the driven sprockets and the drive sprocket. The crankshaft 118 thus drives the respective camshafts 172, 174 through the timing chain in the timed relationship. Because the camshafts 172, 174 must rotate at half of the speed of the rotation of the crankshaft 118 in the four-cycle combustion principle, a diameter of the driven sprockets is twice as large as a diameter of the drive sprocket.

The engine 32 preferably has a port or manifold fuel injection system. With reference to FIG. 3, the fuel injection system preferably comprises four fuel injectors 198 with one fuel injector allotted for each of the respective combustion chambers 110 through suitable fuel conduits. Each fuel injector 198 preferably has an injection nozzle directed toward the associated intake passage 130 adjacent to the intake ports 128. The fuel injectors 198 preferably are mounted on a fuel rail 199. Preferably, the fuel rail 199 extends generally vertically and is mounted on the intake manifolds (not shown). The fuel rail 199 also defines a portion of the fuel conduits.

A heat exchanger 200 preferably is provided to cool the fuel and extends parallel to the fuel rail 199. The heat exchanger 200 preferably comprises a pair of fluid pipes, one of which defines part of the fuel conduits and the other defines a water passage through which cooling water can flow.

With reference to FIGS. 3 and 4, the illustrated fuel injection system additionally comprises a fuel pump assembly 500 that is actuated by the intake camshaft 172. The fuel pump assembly 500 is mounted on the camshaft cover member 179 and is disposed adjacent to the intake cam 181 that actuates the intake valve 134 associated with the combustion chamber 110 positioned second from the bottom.

The fuel pump assembly 500 preferably comprises a bottom housing member 502, a middle housing member 504 and a top housing member 506. The housing members 502, 504, 506 are coupled together by bolts 508. The bottom housing member 502 forms a projection 510. The camshaft cover member 179 defines an opening at a support portion 512 thereof and the projection 510 is fitted into the opening so that the fuel pump assembly 500 is mounted on the cover member 179. Fasteners such as bolts can fix the pump assembly 500 to the cover member 179.

A diaphragm 516 preferably is provided with a periphery portion thereof interposed between the bottom and middle housing members 502, 504. A pump rod 518 depends from the diaphragm 516. A top portion 520 of the pump rod 518 preferably supports upper and lower plates 524, 526 which together sandwich the diaphragm 516 therebetween. The bottom housing member 502 defines a guide section 530 that slidably supports the top portion 520 of the pump rod 520. A spring 532 urges the diaphragm 516 upwardly such that the lower plate 526 does not abut the guide section 530. The guide section 530 and the projection 510 together define a recess in which a slider 534 slides. A spring 536 biases the slider 534 downwardly. The slider 534 defines a recess therein in which a lower portion of the pump rod 520 slides. A lowermost end 538 of the slider 534 protrudes downwardly.

An arm member 540 is journaled on a support shaft 542 for pivotal movement about an axis of the shaft 542. The support shaft 542 is affixed to the bearing cap 178. The lowermost end 538 of the slider 534 is biased against a top surface of the arm member 540 by the spring 536. The arm member is thereby biased against the cam 181. The cam 181 thus lifts the slider 534 upwardly when the cam lobe 181a meets the arm member 540.

The diaphragm 516 defines a pump chamber 546 together with the middle housing member 504. The middle housing member 504 and the top housing member 506 in turn together define an inlet chamber 548 and an outlet chamber 550 both of which are separated from each other. The inlet chamber 548 is connected toward a fuel source such as, for example, a fuel tank, while the outlet chamber 550 is connected toward the fuel rail 199. The inlet chamber 548 also is connected to the pump chamber 546 through an inlet path member 552 fitted into an aperture communicating with both the inlet and pump chambers 548, 546. The outlet chamber 550 also is connected to the pump chamber 546 through an outlet path member 554 fitted into an aperture communicating with both the outlet and pump chambers 550, 546.

One end of the inlet path member 552 is open to the inlet chamber 548 and another end thereof is closed but one or a plurality of side openings are formed in close proximity to this end to communicate with the pump chamber 546. A flange 558 is provided adjacent to the side openings so as to somewhat impede fuel from moving to the pump chamber 546. Similarly, one end of the outlet path member 554 is open to the pump chamber 546 and another end thereof is closed but one or more side openings are formed in close proximity to this end to communicate with the outlet chamber 550. A flange 560 is provided adjacent to the side openings so as to somewhat impede fuel from moving to the outlet chamber 550.

With the intake camshaft 172 rotating, the cam 181 lifts the arm member 540 at every moment when the cam lobe 181a meets the arm member 540. The arm member 540 thus repeatedly pivots about the axis of the support shaft 542 and reciprocally moves the slider 534 together with the spring 536. The slider 534 pushes the pump rod 518 upwardly when the slider 534 moves upwardly and releases the pump rod 518 when the slider 534 moves downwardly so that the pump rod 518 also repeatedly moves upwardly and downwardly. The diaphragm 516, which is affixed to the top portion 520 of the pump rod 518, thus move upwardly and downwardly. The volume of the pump chamber 546 thus is repeatedly changed. Accordingly, the fuel in the pump chamber 546 moves into the outlet chamber 550 through the outlet path member 554 and the fuel in the inlet chamber 548 moves into the pump chamber 546 through the inlet path member 552. The fuel pump 500 thus can deliver the fuel from the fuel tank to the fuel rail 199.

The fuel injectors 198 spray fuel into the intake passages 130 under control of an ECU 201 (FIG. 5) which preferably is mounted on the engine body 124 at an appropriate location. The ECU 201 controls both the start timing and the duration of the fuel injection cycle of the fuel injectors 198 so that the nozzles spray a proper amount of the fuel for each combustion cycle. The fuel injection control unit within the ECU 201 is illustrated in FIG. 5 with reference numeral 202 and is described below. Of course, the fuel injectors 198 can be disposed for direct cylinder injection and carburetors can replace or accompany the fuel injectors 198.

With reference to FIGS. 2 and 5, the engine 32 further comprises an ignition or firing system. Each combustion chamber 110 is provided with a spark plug 203 that is connected to the ECU 201 through an igniter so that ignition timing is also controlled by the ECU 201. Each spark plug 203 has electrodes that are exposed into the associated combustion chamber and are spaced apart from each other with a small gap. The spark plugs 203 generate a spark between the electrodes to ignite an air/fuel charge in the combustion chamber 110 at selected ignition timing under control of the ECU 201. The ignition timing control unit within the ECU 201 is illustrated in FIG. 5 with reference numeral 205 and is described below.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves 156 (FIG. 5) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 203 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the body of water. The cooling system includes one or more water jackets defined within the engine body 124 through which the water travels to remove heat from the engine body 124. The foregoing heat exchanger 200 can use part of the water flowing through the cooling system.

The engine 32 also preferably includes a lubrication system. A closed-loop type system preferably is employed in the illustrated embodiment. The lubrication system comprises a lubricant tank defining a reservoir, which preferably is positioned within the driveshaft housing 54. An oil pump (not shown) is provided at a desired location, such as atop the driveshaft housing 54, to pressurize the lubricant oil in the reservoir and to pass the lubricant oil through a suction pipe toward certain engine portions, which desirably are lubricated, through lubricant delivery passages. The engine portions that need lubrication include, for example, the crankshaft bearings (not shown), the connecting rods 120 and the pistons 106. Portions 214 of the delivery passages (FIG. 2) can be defined in the crankshaft 118. Lubricant return passages (not shown) also are provided to return the oil to the lubricant tank for re-circulation.

A flywheel assembly 216 (FIG. 2) preferably is positioned at an upper end of the crankshaft 118 and is mounted for rotation with the crankshaft 118. The flywheel assembly 216 comprises a flywheel magneto or AC generator that supplies electric power to various electrical components such as the fuel injection system, the ignition system and the ECU 201 (FIG. 5). A protective cover 218, which preferably is made of plastic, extends over majority of the top surface of the engine 32 and preferably covers the portion that includes the fly wheel assembly 216 and the camshaft drive mechanism 186.

The protective cover 218 preferably has a rib (not shown) that reduces or eliminates the amount of air flowing directly toward the engine portion that has the air induction system 126, i.e., to the portion on the starboard side. The protective cover 218 also preferably has a rib 220 (FIG. 2) that substantially or completely inhibits air from flowing directly toward a front portion of the engine body 124. The ribs advantageously help direct the airflow around the engine body 124 to cool the engine body 124. As seen in FIG. 2, a bottom portion, at least in part, of the protective cover 218 desirably is left open to allow heat to radiate from the engine 32.

With reference back to FIG. 1, the driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

With continued reference to FIG. 1, the lower unit 56 depends from the driveshaft housing 54 and supports a propulsion shaft 226 that is driven by the driveshaft 222. The propulsion shaft 226 extends generally horizontally through the lower unit 56 and is journaled for rotation. The propulsion device 41 is attached to the propulsion shaft 226. In the illustrated arrangement, the propulsion device includes a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The transmission 232 includes a switchover mechanism (not shown) that is configured to change a rotational direction of the propeller 228 between forward, neutral or reverse. The switchover mechanism typically comprises a dog clutch and a shift unit that operates the dog clutch. In the illustrated embodiment, a control box 400 is provided in the watercraft 40 for controlling, at least in part, the operation of the switchover mechanism. The control box 400 comprises an operation lever 402, which is coupled to the switchover mechanism through a shift cable 404. At the forward and reverse positions, which are propulsion positions, the propeller 228 propels the watercraft 40 forward and backward, respectively. At the neutral position, which is a-non-propulsion position, the propeller 228 does not propel the watercraft 40 because the propulsion shaft 226 is disconnected from the driveshaft 222.

Preferably, the control lever 402 is also interconnected with the throttle valve linkage through a throttle cable 406. In this manner, a single control lever 402, which is the foregoing lever, is connected with not only the throttle valve but also the switchover mechanism to control both of them in an interrelationship such that the throttle valve is always closed (or almost closed) when the transmission is placed in the neutral position by the switchover mechanism, except for an engine racing operation. The throttle linkage can be released from the switchover mechanism for racing operation. The position of the throttle valve is determined by a throttle position sensor 352, which will be described in more detail below. In this manner, the operator may set the motor 30 in a low, intermediate or high cruising speed range.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then through a discharge section defined within the hub of the propeller 228. Preferably, the outboard motor 30 also includes an idle exhaust discharge (not shown) configured to discharge exhaust gases to the atmosphere at a position above the waterline WL at idle engine speeds.

VVT Mechanism

With reference to FIGS. 2 and 4, a VVT mechanism 240 will now be described. The VVT mechanism 240 preferably is configured to adjust the angular position of the intake camshaft 172 relative to the intake driven sprocket 188 between two limits, i.e., a fully advanced angular position and a fully retarded angular position. At the fully advanced angular position, the intake camshaft 172 opens and closes the intake valves 134 at a most advanced timing. In contrast, at the fully retarded angular position, the intake camshaft 172 opens and closes the intake valves 134 at a most retarded timing.

The VVT mechanism 240 preferably is hydraulically operated and thus comprises an adjusting section 242, a fluid supply section 244 and a control section 246. The adjusting section 242 sets the intake camshaft 172 to an angular position in response to a volume of working fluid that is allotted to two spaces of the adjusting section 242. The fluid supply section 244 preferably supplies a portion of the lubricant, which is used primarily for the lubrication system, to the adjusting section 242 as the working fluid. The control section 246 selects the rate or amount of the fluid directed to the adjusting section 242 under control of the ECU 201 (FIG. 5).

With reference to FIG. 4, the adjusting section 242 preferably includes an outer housing 250 and an inner rotor 252. The outer housing 250 is affixed to the intake driven sprocket 188 by bolts (not shown) in the illustrated arrangement and preferably forms three hydraulic chambers 256 between the bolts. Any other suitable fastening technique and any suitable number of chambers 256 can be used.

The inner rotor 252 is affixed atop the intake camshaft 172 by a bolt 258 and may three vanes (not shown) extending into the respective chambers 256 of the housing 250. The number of vanes 260 can be varied and the inner rotor 252 can be attached to the camshaft 172 in any suitable manners. In one embodiment, the vanes 260 extend radially and are spaced apart from each other with an angle of about 120 degrees. The two sides of the vane, together with walls 262 of each chamber 256, define a first space S1 and a second space S2, respectively. Seal members (not shown) carried by the respective vanes abuts an inner surface of the housing 250 and thereby substantially seal the first and second spaces S1, S2 from each other.

The respective first spaces S1 communicate with one another through respective pathways 270 and a passage 272 that is formed on an upper surface of the rotor 252 and extends partially around the bolt 258. The respective second spaces S2 communicate with one another through respective pathways 274 and a passage 276 which is formed on a lower surface of the rotor 252 and extends partially around the bolt 258. The passages 272, 276 generally are configured as an incomplete circular shape and can be offset from one another (e.g., a 60 degree offset may be used).

A pathway 278 extends from the passage 272 to a bottom portion of the rotor 252 between the ends of the passage 276. A cover member 280 preferably is affixed to the outer housing 250 by screws 282 to cover the bolt 258. The cover member 280 preferably is made of rubber, synthetic resin or sheet metal and can be fitted into an aperture 283 without using the screws 282. The passages 272, 276 allow fluid communication with the respective pathways 270, 274, 278 during rotation of the camshaft 172.

With reference to FIGS. 2 and 4, the fluid supply section 244 preferably includes a supply passage 284 and two delivery passages 286, 288. The supply passage 284 and the delivery passages 286, 288 communicate with one another through the control section 246. The supply passage 284 preferably has a passage portion 284a (FIGS. 2 and 4) defined in the cylinder head member 108 and a passage portion 284b (FIG. 2) defined in the bearing cap 176. The passage portion 284a is connected to the lubrication system, while the passage portion 284b is connected to the control section 246. Thus, the lubricant oil of the lubrication system is supplied to the control section 246 through the fluid supply passage 284.

The supply passage 284 communicates with the lubrication system so that a portion of the lubricant oil is supplied to the VVT mechanism 240 as working fluid through the passage portions 284a, 284b. Because the passage portion 284a is formed by a drilling process in the illustrated embodiment, a closure member 290 closes one end of the passage portion 284a. The passage portion 284b may be branched off to a camshaft lubrication passage (not shown) which delivers lubricant for lubrication of a journal of the camshaft 172.

The delivery passages 286, 288 preferably are defined in a top portion of the camshaft 172 and the bearing cap 176. A portion of the delivery passage 286 formed in the camshaft 172 includes a pathway 292 that extends generally vertically and that communicates with the pathway 278 that communicates with the passage 272 of the first space S1. The pathway 292 also communicates with a passage 294 that is formed as a recess in the outer surface of the camshaft 172.

A portion of the delivery passage 288 formed in the camshaft 172, in turn, includes a pathway 296 that extends generally vertically and communicates with the passage 276 of the second space S2. The pathway 296 also communicates with a passage 298 that is formed as a recess in the outer surface of the camshaft 172.

A portion of the delivery passage 286 formed in the bearing cap 176 includes a pathway 300 that extends generally vertically and generally horizontally to communicate with the passage 294. Similarly, a portion of the delivery passage 288 formed in the bearing cap 176 includes a pathway 302 that extends generally vertically and generally horizontally to communicate with the passage 298. The other ends of the pathways 300, 302 communicate with a common chamber 304 formed in the control section 246 through a pair of ports, respectively.

A seal member 310 is disposed between the cylinder head member 108, the camshaft 172 and the bearing cap 176 to inhibit the lubricant from leaking out. It should be noted that FIGS. 2 and 4 illustrate the delivery passages 286, 288 in a schematic fashion. The passages 286, 288 do not merge together.

With continued reference to FIGS. 2 and 4, the control section 246 preferably includes an oil control valve (OCV) 314. The OCV 314 comprises a housing section and a cylinder section 318. Both the housing and cylinder sections preferably are received in the bearing cap 176. Because the sections together extend through a hole of the camshaft cover member 179, a bellow (not shown) made of rubber may be provided between the housing section and the camshaft cover member 179 to close and seal the hole.

The cylinder section 318 defines the common chamber 304 that communicates with the supply passage 284 and the delivery passages 286, 288. A rod 324 extends into the common chamber 304 from the actuator and is axially movable therein. The OCV 314 is preferably configured such the direction of lubricant flow to the delivery passages 286, 288 may be switched by moving the rod 324 of the OCV 314 back and forth within the cylinder section 318. In this manner, lubricant may be selectively supplied to the first and second spaces S1, S2. The housing section 316 preferably encloses a solenoid type actuator, although other actuators of course are available.

In one embodiment, the rod 324 has a pair of valves (not shown) and a pair of guide portions (not shown). The valves and the guide portions have an outer diameter that is larger than an outer diameter of the remainder portions of the rod and is generally equal to an inner diameter of the cylinder section. The rod 324 defines an internal passage 334 extending through the rod 324 and apertures (not shown) communicating with the passage 334 and the common chamber 304 to allow free flow of the fluid in the chamber 304. A coil spring (not shown) is retained in a spring retaining space at an end of the cylinder 318 opposite to the housing section to urge the rod 324 toward the actuator. The fluid may be drained to the camshaft chamber 180 through the spring retaining chamber and a drain hole.

The actuator, i.e., solenoid, actuates the rod 324 under control of the ECU 201 (FIG. 5) so that the rod 324 can take any position in the chamber 304. More specifically, the solenoid pushes the rod 324 toward a position in compliance with commands of the ECU 201. If a certain position designated by the ECU 201 is closer to the solenoid than a current position, then the solenoid does not actuate the rod 324 and the coil spring pushes the rod 324 back to the desired position. Alternatively, the solenoid can be configured to pull the rod 324 back to the position.

The valve 326 can close or partially close the ports into the delivery passages 286, 288. The size of the openings at the ports into the delivery passages 286, 288 determine an amount of the fluid that is allotted to each delivery passage 286, 288 and to each space S1, S2 in the adjusting section 242. The amount of fluid delivered to each space S1, S2 thus determines an angular position of the camshaft 172. If more fluid is allotted to the first space S1 than to the second space S2, the camshaft 172 is adjusted closer to the fully advanced position, and vise versa.

The oil pump pressurizes the lubricant oil to the supply passage 284 and further to the common chamber 304 of the cylinder 318. Meanwhile, the ECU 201 (FIG. 5) controls the solenoid. The solenoid moves the rod 324 and thus adjusts the degree to which the valves 326, 328 allow the chamber to communicate with the ports of the delivery passages 286, 288, respectively. The ECU 201 thereby controls the angular position of the camshaft 172. Preferably, a drain is provided to allow the working fluid to drain from the space that is being evacuated while pressurized working fluid flows into the opposing space.

In one mode of operation, for example, the working fluid is fed to the common chamber 304 of the cylinder 318. Thus, the common chamber 304 has a positive pressure. To move the camshaft 172 in a first direction relative to the input sprocket 188, the common chamber 304 is linked with the delivery passage 286 while the other of the delivery passage 288 is linked to a drain. Thus, pressurized fluid will flow into the first space S1 while fluid will be displaced from the second space S2. The displaced fluid flows through the passage 334 and to the drain and thereby returns to the lubrication system. Once the desired movement has occurred, the rod 324 is returned to a neutral position in which the common chamber 304 is no longer communicating with either of the delivery passages 286, 288. Additionally, in the neutral position, neither of the delivery passages 286, 288 communicates with the drain in one particularly advantageous arrangement. Of course, by varying the placement and size of the seals, a constant flow can be produced from supply to drain while the rod 324 is in a neutral position. Also, a constant flow into the delivery lines also can be constructed. In the illustrated arrangement, however, no flow preferably occurs with the system in a neutral position.

In general, the engine and the VVT mechanism are disclosed in, for example, a co-pending U.S. application filed Jun. 11, 2001, titled FOUR-CYCLE ENGINE FOR MARINE DRIVE, which is Ser. No. 09/878,323, the entire contents of which is hereby expressly incorporated by reference.

With reference to FIG. 2, in the illustrated arrangement, the camshaft cover member 179 preferably defines an access port 574 below the VVT mechanism 240 and above the fuel pump assembly 500. Preferably, the port 574 defines an opening 575 disposed above the top end 70 of the bottom cowling member 66. A closure member 576 is detachably affixed to close the opening 574. The opening 574 preferably has a size through which a tool such as, for example, a wrench can pass through. The intake camshaft 172 preferably forms a hexagonal portion 586 at which the wrench is engageable.

With the closure member 576 removed, the user, operator, repairperson or mechanic can insert the wrench through the port 575. The wrench is engaged with the hexagonal portion 586 of the camshaft 172 to fix the camshaft 172 (i.e., to prevent the camshaft 172 from rotating).

The repairperson, for example, thus can easily disassemble the sprocket 188 from the camshaft 172 or assemble the sprocket 188 thereto for maintenance service or for other purposes. Because the drain oil accumulated within the camshaft chamber 180 does not spill out, the engine 32 is less likely to be stained by the oil and the repairperson does not need to pay special attention to prevent a large oil spill.

Because the top end of the camshaft cover member 179 is nested in the sprocket 188 in the arrangement, the illustrated sprocket 188 should be disassembled from the camshaft 172 before the cover member 179 is removed. Similarly, in this situation, the wrench inserted through the slot 574 to prevent the camshaft from rotating. The repair person thus can work easily without the need for a special test for preventing the timing chain or belt from moving or preventing the vanes of the VVT 240 from rotating. Accordingly, the amount of labor needed can be reduced.

In addition, no large change in configuration on the camshaft or on components around the camshaft is necessary and an ordinary tool such as the wrench can be used. Thus, the outboard motor does not need to provide a large space for a special construction and does not require additional labor for the maintenance service.

Other polygon shaped portions can replace the hexagonal portion 586 of the camshaft 172. For example, a triangular shape or a rectangular shape can be applied as the polygon shape.

In addition, the access opening 574 can be in the fan of, for example, a slot, a circular, or a rectangular configuration.

Control System

With reference to FIG. 5, a control system, which includes the ECU 201, is described below.

FIG. 5 schematically illustrates the engine 32 and the ECU 201. The illustrated ECU 201 adjusts the valve timing of the intake valves 134 by changing the angular positions of the intake camshaft 172 relative to the sprocket 188 through the VVT mechanism 240. The ECU 201 is connected to the OCV 314 through a control signal line. As discussed above, the ECU 201 also controls the fuel injectors 198 using the fuel injection control unit 202 and the spark plugs 203 through the ignition timing controller 205.

In order to control the VVT mechanism 340, the fuel injectors 198, and the ignition timing controller 205, the ECU 201 can employ various sensors which sense operational conditions of the engine 32 and/or the outboard motor 30. In the illustrated system, the ECU 201 uses a camshaft angle position sensor 350, a crankshaft angle position sensor 352, a throttle position sensor (or throttle valve opening degree sensor) 354 and an intake pressure sensor 356. The ECU 201 is connected to the sensors 350, 352, 354, 356 through sensor signal lines.

The camshaft angle position sensor 350 preferably is associated with the intake camshaft 172 to sense an angular position of the intake camshaft 172 and sends a camshaft angle position signal to the ECU 201 through the signal line. With reference to FIG. 2, the camshaft position sensor 350 preferably is positioned adjacent to a portion of the camshaft 172 located between the second and third cylinders of the engine 32. That is, the sensor 350 is placed below the housing section 316 of the OCV 314 of the VVT mechanism 240, more specifically, below the opening 574, and above the fuel pump assembly (not shown in FIG. 2). The sensor 350 preferably is located above the top end 70 of the bottom cowling member 66. Further details of the illustrated embodiment of the sensor 350 are disclosed in, for example, a co-pending U.S. application filed Jul. 25, 2002, titled FOUR-CYCLE ENGINE FOR MARINE DRIVE, which is Ser. No. 10/205,049, which is incorporated by reference above.

With reference back to FIG. 5, the crankshaft angle position sensor 352 is associated with the crankshaft 118 to sense an angular position of the crankshaft 118 and sends a crankshaft angle position signal to the ECU 201 through the signal line. Any conventional crankshaft angle position sensors and any conventional arrangements thereof can be applied.

Both the camshaft angle position sensor 350 and the crankshaft angle position sensor 352 in the present system generate pulses as the respective signals. The pulse of the camshaft position sensor 350 can give an actual angular position of the camshaft 172. The crankshaft position signal together with the camshaft position signal allows the ECU 201 to accurately determine the position of the camshaft 172 in relation to the crankshaft 118.

With continued reference to FIG. 5, the throttle position sensor 354 preferably is disposed atop the valve shaft to sense an angular position between the open and closed angular positions of the throttle valves and sends a throttle valve position signal to the ECU 201 through the signal line.

The intake sensor 356 preferably is disposed either within one of the intake passages 130 or within the plenum chamber to sense an intake pressure therein. Because the respective intake passages 130 are formed such that each generally is the same size as the others, and because the plenum chamber collects a large volume of air that is supplied to each of the intake passages 130, every passage 130 has substantially equal pressure and a signal of the intake pressure sensor 356 thus can represent a condition of the respective pressure. Thus, it should be appreciated that a single pressure sensor or multiple pressure sensors can be used.

The throttle valve position sensor 354 and the intake pressure sensor 356 preferably are selected from a type of sensor that indirectly senses an amount of air in the induction system. Another type of sensor that directly senses the air amount, of course, can be applicable. For example, moving vane types, heated wire types and Karman Vortex types of air flow meters also can be used.

The operator's demand or engine load, as determined by the throttle opening degree, is sensed by the throttle position sensor 354. Generally, in proportion to the change of the throttle opening degree, the intake air pressure also varies and is sensed by the intake pressure sensor 356. The throttle valve is opened when the operator operates the throttle lever 402 (see FIG. 1) to increase power output of the engine 32 and thus the speed of the watercraft 40. The intake pressure almost simultaneously decreases as the throttle valve opens.

The engine load can also increase when the associated watercraft 40 is moving against wind. In this situation, the operator also operates the throttle lever to recover the speed that may be lost. Therefore, as used in this description, the term "acceleration" means not only the acceleration in the narrow sense but also the recovery of speed by the operator in a broad sense. Also, the term "sudden acceleration" means the sudden acceleration in the narrow sense and a quick recovery of speed by the operator in a broad sense.

The signal lines preferably are configured with hard-wires or wire-harnesses. The signals can be sent through emitter and detector pairs, infrared radiation, radio waves or the like. The type of signal and the type of connection can be varied between sensors or the same type can be used with all sensors which are described above and additional sensors described below.

Signals from other sensors or control signals also can be used for the control by the ECU 201. In the present control system, various sensors other than the sensors described above are also provided to sense the operational condition of the engine 32 and/or the outboard motor 30. For example, an oil pressure sensor 360, a water temperature sensor 362, an engine body temperature sensor 364, a transmission position sensor 366, a transmission position change operation sensor 368, an oxygen sensor 370 for determining a current air/fuel ratio and an intake air temperature sensor 372 are provided in the present control system. The sensors except for the transmission sensor 366 and the transmission position change operation sensor 368 can sense the operational conditions of the engine 32 and send signals to the ECU 201 through respective sensor signal lines. The transmission position sensor 366 senses whether the transmission 232 (FIG. 1) is placed at the forward, neutral or reverse position and sends a transmission position signal to the ECU 201 through the signal line. The transmission position change operation sensor 368 senses whether the transmission position change operation is conducted and sends a transmission position change operation signal to the ECU 201 through the signal line.

The foregoing sensors 354–372 in a broad sense, define sensors 373 that sense operational conditions of the engine and/or the outboard motor. The ECU 201 may be provided with an operational condition unit 380, which may be configured to use the signals from the sensors 373 described above may be to determine the operational condition of the engine 32 and/or the outboard motor 30. Information generated by the operational condition unit 380 may be used by the fuel injection control unit 202 and the ignition timing unit 205 for control of the spark plugs 203, the fuel injectors 198, respectively.

The ECU 201 can be designed as a feedback control device using the signals of the sensors. The ECU 201 preferably has a central processing unit (CPU) and some storage units which store various control maps defining relationships between parameters such as, for example, the engine speed, the throttle valve position and the intake pressure (and/or an amount of intake air) to determine an optimum control conditions. The ECU 201 then controls the VVT mechanism 240, the fuel injectors 198 and other actuators in accordance with the determined control condition.

The control units (e.g., the fuel injection control unit 202 and the ignition timing control unit 205) can be in the form of a hard-wired circuit, a dedicated processor and memory, or a general purpose processor and memory running one or a plurality of control programs. For easier understanding of the reader, the units will be described as if they were discriminate and substantial units. The illustrated fuel injection control unit 202 controls the fuel injectors 198 using at least the throttle position signal from the throttle position sensor 354 and the intake pressure signal from the intake pressure sensor 356.

The ECU 201 preferably comprises, other than the control units described above, an actual camshaft angular position calculation (ACAPC) unit 384, an engine speed calculation unit 386, a target camshaft angular position calculation (TCAPC) unit 388, and a control value calculation unit 390. The TCAPC unit 388 and the control value calculation unit 390 together form an OCV control section 392 in the illustrated ECU configuration.

The ACAPC unit 384 preferably receives the actual camshaft angular position signal from the camshaft angle position sensor 350 and the crankshaft angular position signal, which gives two possible ranges of camshaft angular position, from the crankshaft angle position sensor 352. The ACAPC unit 384 then calculates a deviation value which indicates how much the actual camshaft angular position deviates within the two possible ranges of camshaft angular position. The engine speed calculation unit 386 receives the crankshaft angular position signal from the crankshaft angle position sensor 352 and calculates an engine speed using the signal versus time. In the illustrated ECU 201 arrangement, the signal from the ACAPC unit 384 and engine speed calculation unit 386 may be used by the operational condition unit 380 to determine the operational condition of the engine 32 and/or watercraft 30.

The TCAPC unit 388 receives the deviation value from the ACAPC unit 384, the engine speed from the engine speed calculation unit 386 and at least one of the throttle valve opening degree signal from the throttle valve position sensor 354 and the intake pressure signal from the intake pressure sensor 356. The TCAPC unit 388 then calculates a target camshaft angular position based upon the deviation value, the engine speed and either the throttle valve opening degree signal or the intake pressure signal.

The control value calculation unit 390 receives the target camshaft angular position from the TCAPC unit 388 and calculates a control value of the OCV 314 of the VVT mechanism 240. That is, the control value calculation unit 390 determines how much fluid should be delivered to either the space S1 or the space S2 of the adjusting section 242 of the VVT mechanism 240 based upon the target camshaft angular position.

Under a normal running condition and an ordinary acceleration condition (i.e., not sudden acceleration condition), the ECU 201 preferably uses either a combination of the throttle valve opening degree signal with the engine speed signal (α-N method) or a combination of the intake pressure signal with the engine speed signal (D-j method) to calculate the target camshaft angular position. Otherwise, the ECU 201 can use a mixed combination of the α-N method and the D-j method under the normal running condition or the ordinary acceleration condition. The α-N method, the D-j method and the mixed combination thereof are disclosed in, for example, a co-pending U.S. application filed Feb. 14, 2002, titled CONTROL SYSTEM FOR MARINE ENGINE, which is Ser. No. 10/078,275, the entire contents of which is hereby expressly incorporated by reference. An air amount signal sensed by the air flow meter noted above can be applied additionally or instead either the intake pressure signal or the throttle opening degree signal.

Under a sudden acceleration condition, the illustrated ECU 201 uses only the throttle opening degree signal. That is, the ECU 201 always determines, at least prior to controlling the OCV 314 with the OCV control section 392, whether the operator wishes sudden acceleration or not. The sudden acceleration condition preferably is determined when a change rate of the throttle opening degree signal, a change rate of the intake pressure signal or a change rate of the engine speed calculated by the engine speed calculation unit 386 becomes greater than a predetermined magnitude.

A change rate of the air amount signal also can be used to determine the sudden acceleration condition. Theoretically, the predetermined magnitude can be set at any magnitude larger than zero.

The ECU 201 may utilize various control maps (e.g., reference ignition timings corresponding to various operating conditions of the engine or other fundamental engine control data), which may be stored in advance in a storage device (e.g., ROM). In the alternative or in combination, the detection signals from the various sensors 373, the camshaft angle position sensor 350, and or the crankshaft angle position sensor 352 may be utilize by the operational control unit 380 may be used to appropriately control the fuel injection control unit, 202, the ignition timing unit 205 and/or the OCV control section 392. In such control routines, the control unit may calculate target or corrected value based upon a control map and/or the operational conditions of the engine 32 or motor 30.

Figure 6A:
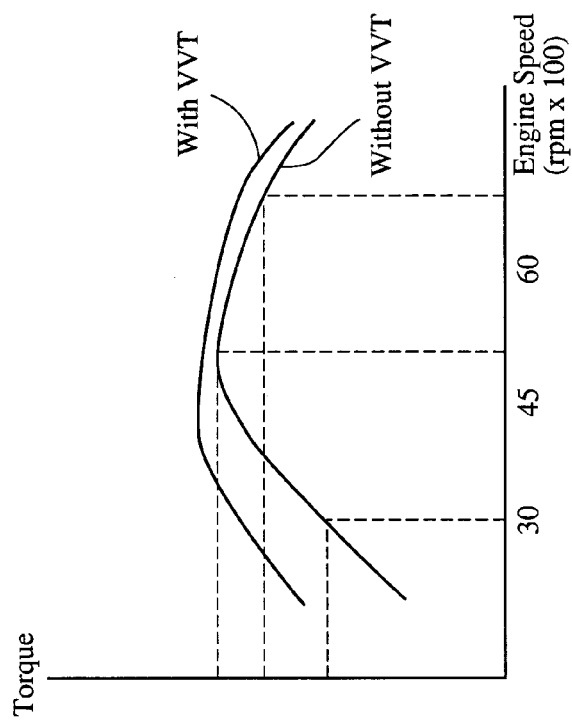
FIG. 6(a) is a graphical view illustrating engine torque as a function of intake valve timing for various engine speeds.
Figure 6B:
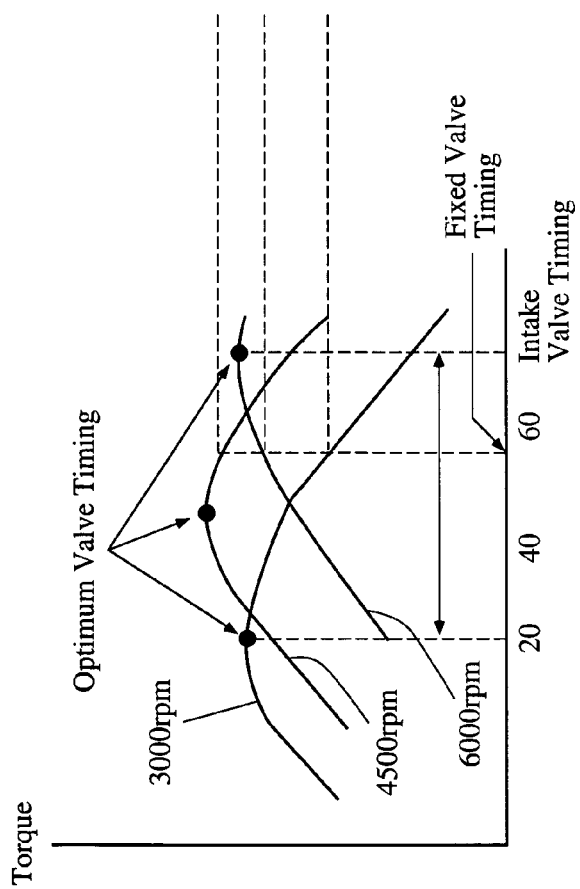
FIG. 6(b) is a graphical view illustrating engine torque as a function of engine speed for an engine with and without control of valve timing.

FIG. 6(a) is an example of a control map that may be used by the ECU 201 to control valve timing. FIG. 6(a) illustrates engine torque for various engine speeds as a function of the timing of the closing of the intake valve 134 (i.e., the angle after bottom dead center at which the intake valve 134 closes). As shown, for each engine speed (e.g., 3000 rpm, 4500 rpm and 6000 rpm) there exists an optimum intake valve closing time at which engine torque is maximized. In comparison, the dashed lines in FIG. 6(a) illustrate the torque achieved for each engine speed if the intake valve closing time is fixed. As a result, as shown in FIG. 6(b), by utilizing the VVT mechanism 240 and the control system described above to control intake valve closing timing, the torque of the engine can be improved over a range of engine speeds as compared to an engine that does not utilize variable valve timing.

Cruising Operation

As mentioned above, in certain conditions, the operator desires to operate the motor 30 (FIG. 1) in a cruising mode. In such a mode of operation, the operator generally tries to keep the engine speed constant to maintain a desired boat speed for a prolonged period of time. This may be accomplished by manipulating the throttle lever 402 (FIG. 1). However, the load experienced by a marine engine, and, in particular, for an outboard motor, can undergo significant fluctuations. Such fluctuations may be caused by weather conditions (e.g., wind direction, wind volume, wave height and wave direction) as discussed above. These fluctuations are generally greater than the fluctuations encountered by land vehicles during cruising operations. Another cause of load fluctuations is wave riding, in which the engine speed drops as the watercraft rides onto a wave and then increases as the watercraft rides over the wave. Accordingly, during cruising, the operator must constantly manipulate the throttle lever 402 in an attempt to compensate for the load fluctuations described above.

A further advantage is provided where, in order to address at least some of the above-mentioned problems, the ECU 201 is configured to compensate for load changes during cruising by adjusting the timing of the intake or exhaust valves 134, 156. For example, as described above with reference to FIGS. 6(a) and 6(b), the engine torque may be increased/decreased by advancing or delaying the intake valve closing time. In this manner, during cruising operation, the engine speed may be adjusted in response to load fluctuations by adjusting the timing of the intake valve 134.

Accordingly, the illustrated embodiment preferably includes a cruising operation control unit 396. As is explained below, the cruising operation control unit 396 can be used with one or more of the sensors described above and/or control units to compensate for fluctuations in the load during a cruising state by adjusting the timing of the intake valve 134. For example, if the engine 32 for the outboard motor 30 is determined to be in a cruising operation mode and if load fluctuations of the engine 32 due to the external factors are produced influencing the maintenance of engine speed, the cruising operation control unit 396 can be configured to react, e.g., increase or decrease the amount of intake air and corresponding amount of fuel/air mixture by regulation of the opening and/or closing timing of the intake valve 134 by controlling the VVT mechanism 240 through the OCV valve 314.

In a preferred embodiment, the cruising operation control unit 396 utilizes signals of at least the throttle position sensor 354, the shift operation detection device 368, the shift position detection device 366, camshaft angle position sensor 350, and/or the crankshaft angle position sensor 352 and data from operational condition unit 380 to determine if the engine is in a cruising mode and to adjust the timing of the intake valve 134 in response to load fluctuations. The ECU 201 may also include a throttle operation device 394, which receives signals from the throttle position sensor 354 and is configured to indicate when the throttle is being operated. In such an embodiment, in advancing or reversing operation of the watercraft, the cruising operation control unit 396 may issue a start command that indicates that the cruising engine speed is to be maintained. This decision may be based on the signal from a throttle operation device 394 indicating that the shift lever 402 is in a fixed position and from the engine speed calculation unit 386 indicating that the engine speed is being maintained at or near a steady state.

In response to such a start command, the actual cam angle calculation device 384, the target cam angle calculation device 388 and the operation condition device 380 may be used to determine a target value of the closing timing of the intake valve 134. Control of the intake valve 134 is performed through the OCV control value calculation device 390, oil control valve 314, VVT mechanism 240, and the intake camshaft 172. In this manner, the amount of intake air and the corresponding amount of intake fuel/air mixture may be controlled to increase/decrease the engine torque. As a result, rotational fluctuations due to fluctuations in the load may be suppressed during cruising operation.

Figure 7:
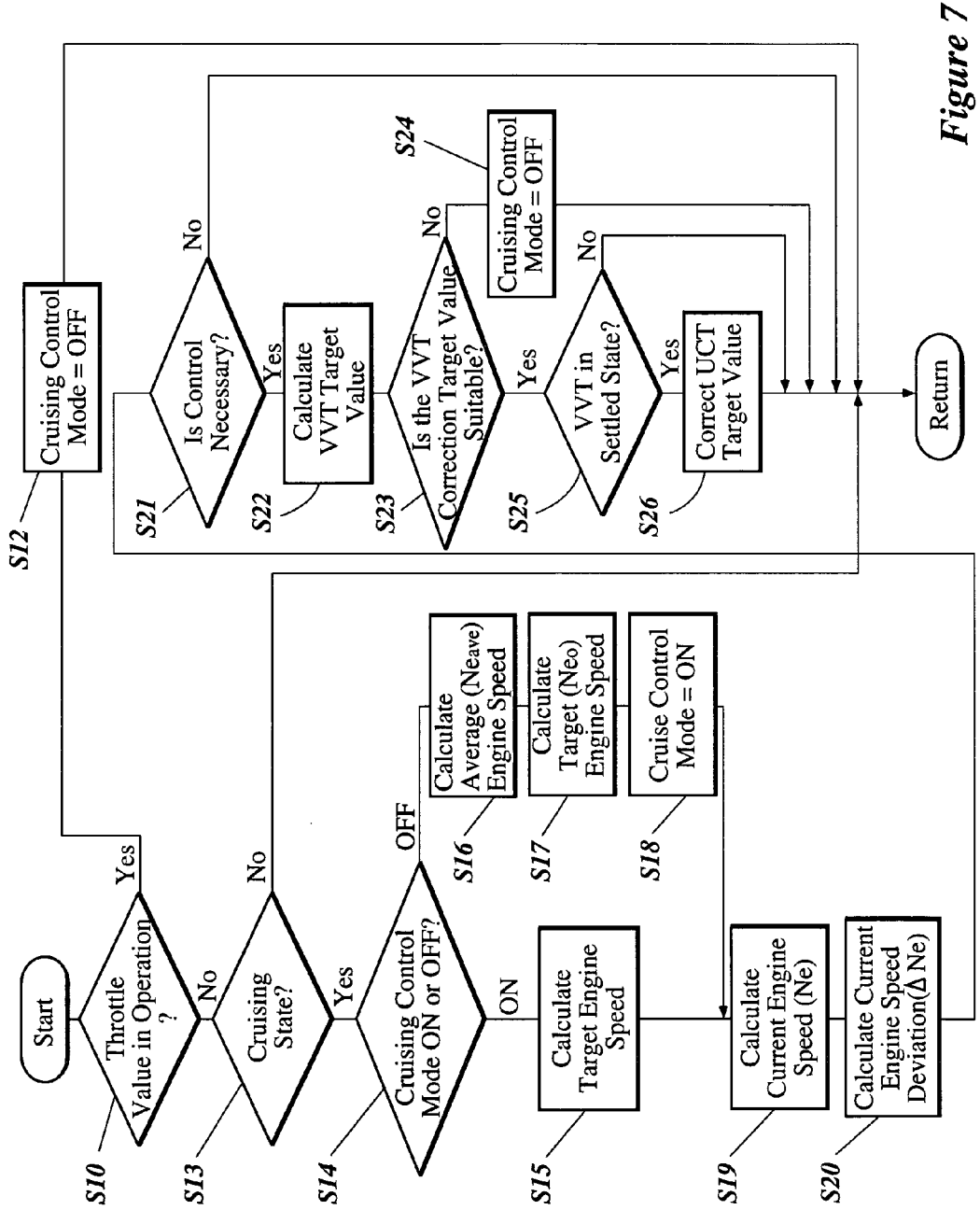
FIG. 7 is a flow chart illustrating a control routine for controlling the VVT mechanism and the engine.

FIG. 7 schematically illustrates an exemplary flow chart of a control routine that may be used by the ECU 201 to reduce engine fluctuations during cruising.

In step S10, it is determined whether the throttle valve in the intake system of the engine 32 is in operation. For example, the throttle valve operation determination device 394 may utilize signals from the throttle position sensor 354 and/or the transmission change sensor 368 to determine if the operator is operating the operation lever 402 within a certain time period. If the throttle valve is in operation, then the engine 32 is not in a cruising state and the routine moves to step S12 where a cruising control mode value is set to "OFF". The routine can then return back to the start of the routine.

If the throttle valve is not in operation, the routine proceeds to the step S13. At this step, it is determined whether the engine 32 is in a cruising operation state. For example, the ECU 201 may utilize the signal from the engine speed calculation unit 386 to determine if the engine speed is stable. In one embodiment, this may be accomplished by determining if the engine speed varies beyond a predetermined range within a time period. In another embodiment, an average engine speed can be calculated over a time period. If the engine speed is not stable, it is judged that the engine 32 is not in a cruising operation state (i.e., accelerating or decelerating) and the routine returns to a new cycle.

If it is determined that the engine 32 is in a cruising operation state, the routine proceeds to step S14. At the step S14, it is determined whether the ECU 201 is in a cruising control mode. That is, whether the cruising control mode value is set to "ON". If it is determined that the cruising control mode value is set to "OFF", then it is known that cruising control will begin in a short time. As such, the routine moves to step S16 through step S18.

At the step S16, an average engine speed $Ne_{ave}$ is determined within a specified amount of time. This calculation may be done utilizing the engine speed calculation unit 386.

At the step S17, a target engine speed $Ne_0$ of the cruising is set as the average engine speed $Ne_{ave}$ determined at the step S16. After completing the setting of the values $Ne_{ave}$ and $Ne_0$, the routine moves onto the step S18 at which the cruising operation mode value is set to "ON". The routine then moves to the step S19, which will be described below.

If it is determined that the cruising control mode is set to "ON", the ECU 201 is in a control mode in which rotational control of the engine 32 during cruising is carried out by adjusting the timing of the intake valve 134. The routine then proceeds to the step S15 at which the target cruising engine speed is set. In the present embodiment, the target cruising engine speed $Ne_{0(n)}$ is set to the previous engine speed $Ne_{0(n-1)}$. The routine then moves to the step S10.

At the step S19, a current engine speed Ne of the engine 10 is calculated. This may be done by utilizing the engine speed calculation unit 386. After completion of the calculation, the routine proceeds to the step S20.

At the step S20, a difference $\Delta Ne$ (e.g., $Ne_0-Ne$) between the target engine speed $Ne_0$ during cruising operation and the current engine speed Ne of the engine 10 is calculated and the routine moves onto the step S21. As the step S21, it is determined whether engine control is necessary during cruising operations. In the present embodiment, this is determined by comparing the calculated engine speed difference $\Delta Ne$ to a threshold value. In one embodiment, threshold values Na or Nb are used. The engine speed threshold Na or Nb may be registered and stored as a map value in advance in a memory in the engine control device 201 or calculated from stored or measured values. If $\Delta Ne$ is greater than Na or if $\Delta Ne$ is less then Nb, it is determined that an occurrence of significant rotational fluctuation due to engine load fluctuations has been caused by external factors during cruising operation (e.g., changes in intensity and direction of wind velocity, wind volume, wind direction, wave height) and that engine control is desired to reduce these rotational fluctuations. If $\Delta Ne$ is less than Na or if $\Delta Ne$ is greater then Nb, then engine control is not necessary and the routine returns to start. At the step S21, the VCT mechanism 240 may be activated to determine whether or not engine torque is to be corrected through regulation of the valve closing timing of the intake valve 240.

If it is determined at the step S21 that engine control is desired, the routine moves to step S22. At the step S22, it is determined how much the VVT target value should be increased or decreased to compensate for the engine speed fluctuation. This determination may be based upon the actual position of the intake cam shaft as determined by the ACAPC control unit 384, the data and signals received by the operational condition control unit 380, the TCAPC unit 388 the OCV control value calculation unit 390, the OCV 314. Use may also be made of control maps stored in advance in a memory in the engine control device 201 or calculated from stored or measured values.

The routine then moves onto step S23 in which it is determined whether or not fluctuations of the engine speed during cruising operation can be suppressed by a correction action based on the VVT target correction value calculated in the previous step (S22). That is, it is determined whether the VVT target value will suppress of the current rotational fluctuation. For example, this may be determined by calculating the result of adjusting the valve closing timing of the intake valve 134 by the VVT target value. The effect of such an adjustment may be made by reference to control maps stored in advance in the memory of the ECU 201 or calculated from stored or measured values. If the determination at the step S23 is "NO" (i.e., the current load fluctuations are beyond the extent of engine torque control by controlling intake valve timing), then the cruising control mode is set to "OFF" (step S24) and the routine is returned back to start.

If the determination at the step S23 is "YES" (i.e., VVT control can reduce current load fluctuations), the routine moves onto the step S25 wherein it is determined if the VVT control is in a settled state as compared to a previous cycle of the routine. For example, in this step, it can be determined if the VVT control from the previous step has been completed by determining if the VVT mechanism 240 is still being operated. If the determination at step S23 is "YES", then the routine moves to the step S26 and the VVT target value is corrected based upon the calculations of the step S22 and appropriate control signals are sent to the OCV 314. The routine is then terminated for a while as the routine returns to a new cycle. If the determination at step S23 is "NO", then the routine returns to a new cycle without correcting the VVT target valve in the step S26. That is, "NO" signifies that the correction action of the previous cycle is still being implemented and therefore the VVT target value should not be corrected yet.

As described above, the control system provides a method and apparatus for automatically suppressing rotational fluctuations due to load fluctuations caused by external factors (e.g., wind, current etc.) during cruising operation of an engine for an outboard motor. In the preferred embodiment, load fluctuations are compensated for by adjusting the intake closing timing of the intake valve. In this manner, the need for the operator to constantly manipulate the throttle valve to suppress changes in engine speed in response to such load fluctuations can be reduced or eliminated.

Figure 8:
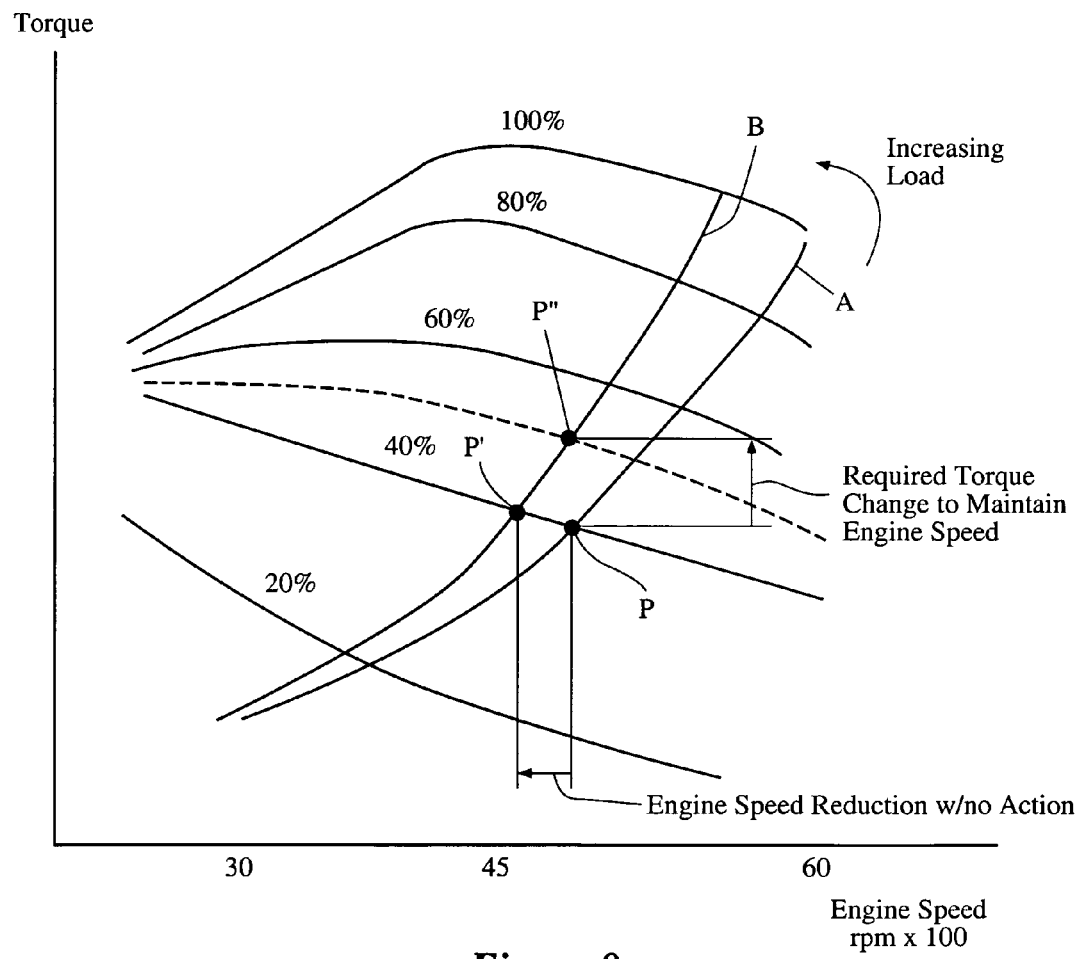
FIG. 8 is a graphical view of engine torque as a function of engine speed for various throttle positions and boat loads.

FIG. 8 graphically illustrates exemplary torque versus engine speed curves for throttle valve openings of 20%, 40%, 60%, 80% and 100% (full throttling, i.e., wide open throttle, WOT). Also illustrated on FIG. 8 are two example boat load curves (i.e., curve A and curve B). In one example, because of an increasing adverse wind, current etc., the boat may change from curve A to curve B as the load on the boat increases. As shown in FIG. 8, if the engine is operating at 40%, then the point P on the torque curve moves to P' with increasing load and the engine speed will drop if no action is taken. Thus, in order to maintain the engine speed, the throttle opening should be regulated so as to increase, for correction, the engine torque to point P''' on the torque curve shown in a dash line. In the prior art, such adjustments were made by manually adjusting the shift lever. In the exemplary embodiment, such an increase in engine torque in response to load fluctuations during cruising of the engine, in particular, may be made automatically by adjusting the intake valve timing and the resulting change in torque as describe above, with particular reference to FIG. 6(*a*) and FIG. 6(*b*).

Figure 9:
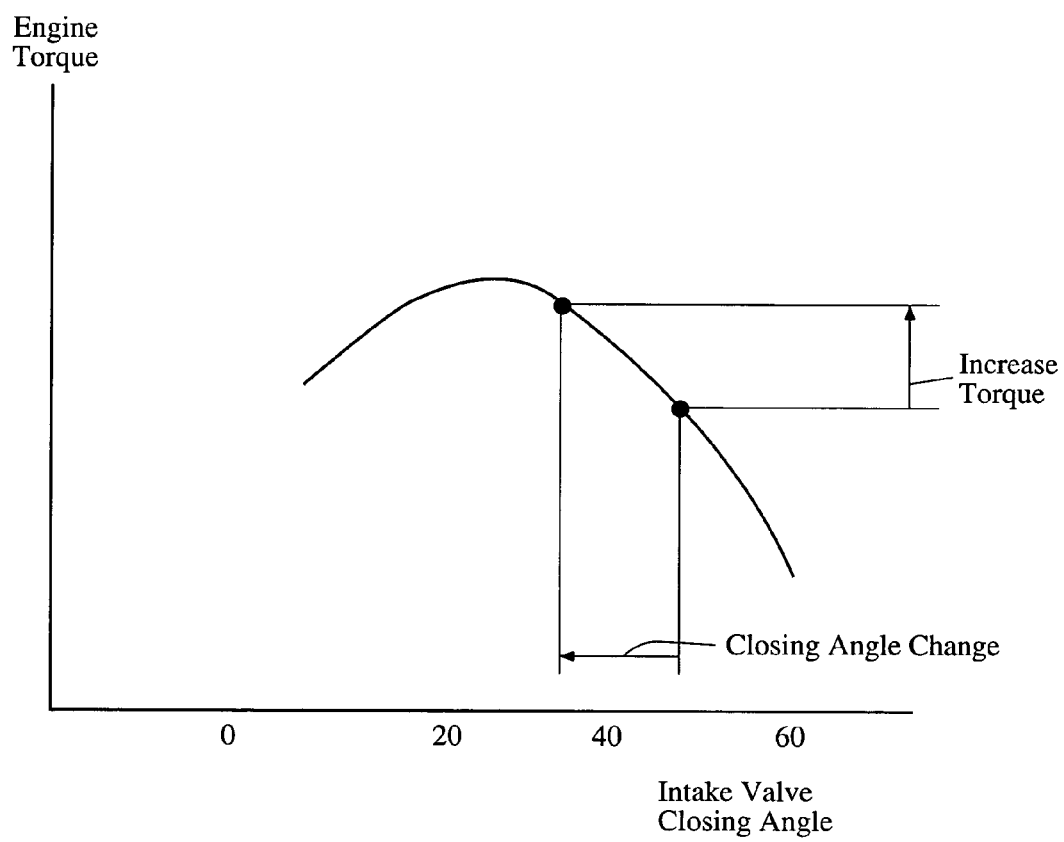
FIG. 9 is a graphical view illustrating engine torque as a function of intake valve timing.

FIG. 9 is a graphical illustration of an exemplary curve showing changes in output torque of the engine for a fixed engine speed when the amount of intake air or intake mixture to each cylinder of the engine 32 is adjusted through variable control of the valve closing timing of the intake valve 134 by the VVT mechanism 240. As shown, engine output torque can be regulated by delaying or advancing the valve closing timing of the intake valve.

Of course, the foregoing description is that of preferred controls having certain features, aspects and advantages in accordance with the present invention. Various changes and modifications also may be made to the above-described controls without departing from the spirit and scope of the invention, as defined by the claims.

What is claimed is:

1. An internal combustion engine comprising an engine body, a movable member movable relative to the engine body, the engine body and the movable member together defining a combustion chamber, the engine body defining intake and exhaust ports communicating with the combustion chamber, an air induction system communicating with the combustion chamber through the intake port, the air induction system including a throttle valve arranged to regulate an amount of air, an exhaust system communicating with the combustion chamber through the exhaust port, an intake valve configured to move between an open position and a closed position of the intake port, an exhaust valve configured to move between an open position and a closed position of the exhaust port, a valve actuator configured to actuate either the intake valve or the exhaust valve, a change mechanism configured to change an actuating timing of the valve actuator at which the valve actuator actuates the intake valve or the exhaust valve, a control device configured to control the change mechanism and at least a first sensor configured to sense movement of the throttle valve and to send a first signal to the control device indicative of movement of the throttle valve, the control device being configured to determine if the engine is in a cruising mode based, at least in part, on the first signal and to control the change mechanism to advance or retard the timing of the valve actuator to reduce engine speed fluctuations when the engine is in a cruising mode.

2. The engine as set forth in claim 1, comprising a second sensor configured to generate a second signal if the throttle valve is in operation and the control device is configured to determine if the engine is in a cruising mode only if the second sensor indicates that the throttle valve is not in operation.

3. The engine as set forth in claim 1, comprising an output shaft coupled with the moveable member for rotation with the moveable member, the first sensor being configured to sense an angular position of the output shaft and to send an angular position signal to the control device, the control device being configured to calculate a rotational speed of the output shaft based upon the angular position signal, the rotational speed comprising a second signal.

4. The engine as set forth in claim 3, wherein the control device is configured to determine if the engine is in a cruising mode based at least in part by said second signal.

5. The engine as set forth in claim 4, wherein the determination of if the engine is in a cruising mode is based at least in part upon an average engine speed over a period of time.

6. The engine as set forth in claim 1, wherein, to reduce engine speed fluctuations, the control device is configured to control the change mechanism to advance or delay the closing of the intake valve.

7. The engine as set forth in claim 1, additionally comprising a crankshaft journaled for rotation at least partially within the engine body, wherein the valve actuator includes a camshaft journaled on the engine body for rotation, the camshaft defining a cam lobe configured to actuate the intake or exhaust valve, the change mechanism being configured to change an angular position of the camshaft relative to the crankshaft.

8. The engine as set forth in claim 1 control device being configured to determine if the engine is in a cruising mode based on movements of the throttle valve.

9. A method for controlling an internal combustion engine including intake and exhaust valves, a valve actuator configured to actuate the intake and exhaust valves, and a change mechanism configured to change an actuating timing of the valve actuator at which the valve actuator actuates at least one of the intake valve and the exhaust valve, the method comprising sensing an operational condition of the engine, determining if a throttle valve is being operated, determining whether the engine is operating in a cruising state based on operations of the throttle valve, determining an engine speed of the engine, determining if the engine speed is fluctuating beyond a predetermined value, and adjusting the actuating timing of the valve actuator to reduce the engine speed fluctuations.

10. The method as set forth in claim 9, wherein if the throttle valve is being operated it is determined that the engine is not in a cruising state.

11. The method as set forth in claim 9, wherein determining whether the engine is operating in a cruising state comprises determining if the engine speed is in a steady state.

12. The method as set forth in claim 11, wherein determining if the engine speed is in a steady state comprises calculating an average engine speed over a specific time period.

13. The method as set forth in claim 9, wherein adjusting the actuating timing of the valve actuator comprises delaying or advancing the closing of the intake valves.

14. The method as set forth in claim 9, wherein adjusting the actuating timing of the valve actuator comprises changing an angular position of a camshaft relative to a crankshaft.

15. A marine propulsion system comprising an internal combustion engine comprising an engine body, a combustion chamber having at least one valve seat, an induction system configured to guide air into the combustion chamber through the valve seat, a valve configured to move between an open position and a closed position of the valve seat, a user-controllable throttle valve configured to meter air flowing through the induction system, the throttle valve being disposed upstream of the valve a valve actuator configured to actuate the valve, a variable valve timing mechanism configured to change an actuating timing of the valve actuator at which the valve actuator actuates the valve, and means for reducing fluctuations in a speed of the engine while the engine is in a cruising mode by adjusting the actuating timing of the valve actuator and means for determining if the propulsion system is in a cruising mode based on movements of the throttle valve.

16. The engine as set forth in claim 15, additionally comprising a crankshaft journaled for rotation at least partially within the engine body, wherein the valve actuator includes a camshaft journaled on the engine body for rotation, the camshaft defining a cam lobe configured to actuate the intake or exhaust valve, the change mechanism being configured to change an angular position of the camshaft relative to the crankshaft.

* * * * *